United States Patent [19]

West

[11] 4,176,766
[45] Dec. 4, 1979

[54] SOUP DISPENSER

[75] Inventor: John B. West, Glyndon, Md.

[73] Assignee: Maryland Cup Corporation, Owings Mills, Md.

[21] Appl. No.: 851,950

[22] Filed: Nov. 16, 1977

Related U.S. Application Data

[63] Continuation-in-part of Ser. No. 827,678, Aug. 25, 1977.

[51] Int. Cl.² ............................................... G01F 11/20
[52] U.S. Cl. .................................... 222/238; 222/333; 222/338; 222/345; 222/370
[58] Field of Search ............... 222/238, 239, 240, 333, 222/337, 345, 370, 338; 141/285

[56] References Cited

U.S. PATENT DOCUMENTS

| | | | |
|---|---|---|---|
| 2,417,700 | 3/1947 | McCarty | 222/333 |
| 3,995,777 | 12/1976 | Diez et al. | 222/370 |

FOREIGN PATENT DOCUMENTS

| | | | |
|---|---|---|---|
| 549474 | 11/1957 | Canada | 222/345 |
| 316453 | 8/1929 | United Kingdom | 222/239 |

Primary Examiner—John P. Shannon
Attorney, Agent, or Firm—Birch, Stewart, Kolasch and Birch

[57] ABSTRACT

A soup dispenser is provided which will dispense liquid, semi-liquid and/or chunky soups, stews, chiles, etc., with equal facility. A motor driven dial configuration of a plurality of measuring chambers or traps is provided at the bottom of a heated reservoir in which an impeller is constantly driven to preclude settling and scorching. The same motor drive is selectively interconnected to rotate the dial and successively register a measuring chamber with a discharge port beneath which a food container can be placed to receive the discharged product. The measuring chambers are vented to atmosphere as registry with the discharge opening is respectively effected to assure full discharge of the food product therein.

30 Claims, 9 Drawing Figures

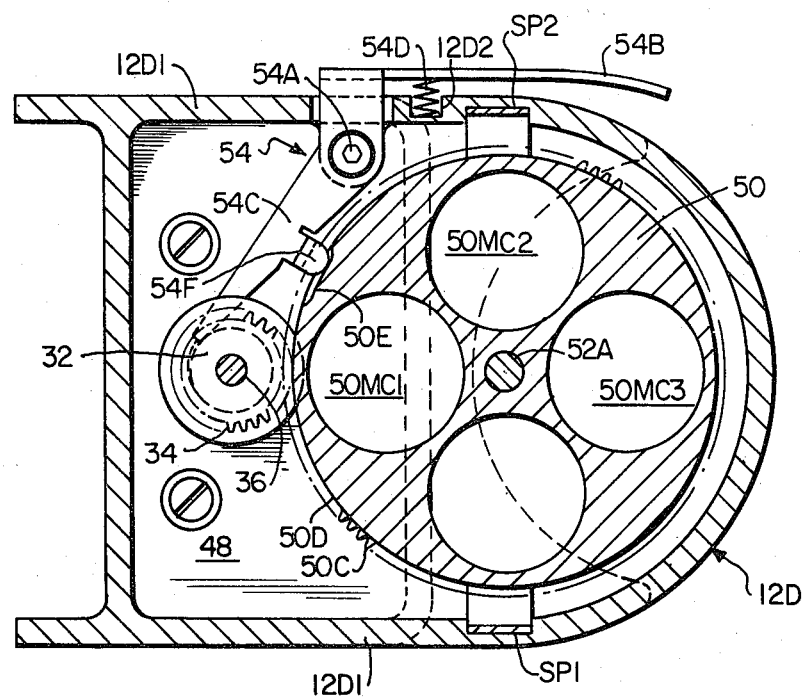
FIG. 4
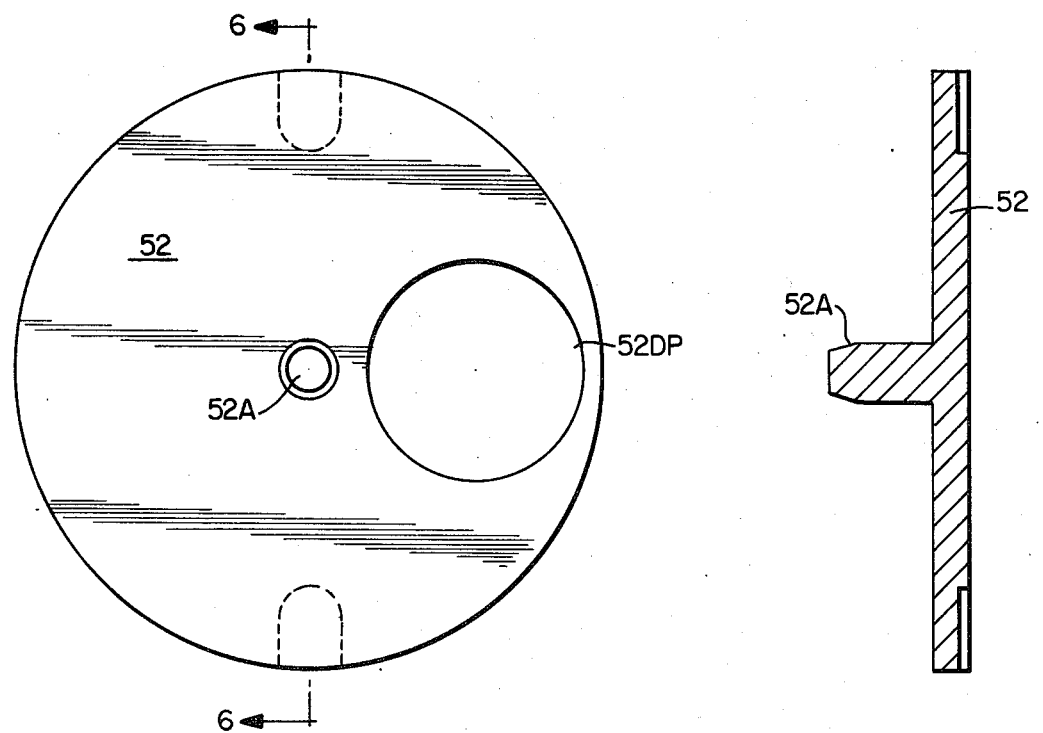
FIG. 5
FIG. 6

SOUP DISPENSER

This application is a continuation-in-part of my co-pending application filed Aug. 25, 1977, Ser. No. 827,678 for SOUP DISPENSER.

FIELD OF THE INVENTION

This invention relates to soup dispensing apparatus and more particularly to soup dispensing and heating apparatus for serving measured quantities of soups by selectively dispensing measured quantities of the soup into containers placed in the apparatus.

BACKGROUND OF THE INVENTION

A number of problems exist with regard to serving soup in its many forms and viscosities with a single serving unit. There is a considerable difference in the characteristics of soups, stews, chiles and the like and accordingly, it is most difficult to provide a universal dispensing device which will handle all these various types of liquid or semi-liquid foods with equal facility.

In order to dispense measured quantities it has been relatively standard in the prior art devices to provide a single trap chamber or the like for measuring a predetermined single quantity into a container. However, such an approach results in an undue amount of garnish or soup solids in the first bowls out of a pot and a reduced quantity of such solids and hence, an inferior grade of soup, in successively dispensed quantities. Once permitted to settle, the soup solids cause the problem to repeat itself.

It is to this problem that the present invention is directed, namely, the provision of dispensing equipment which is equally adapted to highly liquid, semi-liquid, chunky or viscous soups, stews, and the like and which will deliver predetermined quantities of relatively standard quality either in rapid succession or at relatively random frequencies.

It is an object of the present invention to provide a new and novel dispensing apparatus for serving measured quantities of hot soups, stews and other liquid food products.

Another object to the present invention is to provide a new and novel soup and stew and liquid food product dispensing apparatus which has self-contained, agitating and heating means and a multiple cavity volumetric discharge plate which dispenses predetermined sequences of unit volumes from a reservoir to thereby discharge known measured quantities of the food product.

Yet another object to the present invention is to provide a new and novel serving apparatus for soups, stews and liquid food products which is equally facile in its handling of highly-liquid, semi-liquid, chunky and or viscous food products and which is readily disassembled for cleaning purposes after a given use cycle.

These and other objects of the present invention will become more fully apparent with reference to the following specification and drawings which relate to a preferred embodiment of the present invention.

SUMMARY OF THE INVENTION

Basically the soup dispenser and apparatus of the present invention comprises a base stand on which a drive motor is mounted adjacent to a drive shaft and suitable clutch means which in turn are connected through an output shaft which extends upward into a reservoir and which mounts an impeller thereon for rotation within the reservoir.

The reservoir includes a heating device, preferably one of the CROCK-POT principle, in which the heating elements are on the sides of the reservoir to prevent scorching and provide uniform heating. The reservoir includes a lid which may be removed so that soups, stews and other liquid or semi-liquid food products may be loaded into the reservoir. A dual type heating element is provided to permit rapid heating and holding cycles.

At the lower end of the reservoir is a dial-shaped transfer plate in the general configuration of a deep telephone dial type structure in which a plurality of cavities corresponding to holes in the dial are provided, each cavity defining a given volume for receiving a liquid food product to be dispensed.

The volumetric dial transfer plate is mounted in a housing member which is integrally mounted with the reservoir and opening toward the inner end of the reservoir through a top sealing plate ported for registry with at least one of the volumetric chambers in the dial at a time and which includes a bottom sealing plate having a discharge opening of the same size, shape and cross-section as that of each of the multiplicity of volumetric chambers in the transfer plate.

The top sealing plate is integral with the bottom of the reservoir and provides a discharge port which overlies the volumetric transfer plate adjacent to a continuously energized impeller such that excessive quantities of solids or garnish in the liquid food product in the reservoir are precluded from settling in the transfer plate. The top sealing plate discharge port includes a cutting edge to sever any excess food product solids or garnish which may be projecting from a given volumetric cavity in the transfer plate which has been brought into registry with the discharge port as the transfer plate is being rotated to carry the measured volume of product to the final outlet or discharge opening of the dispenser assembly.

A venting means included within the top sealing plate assembly is provided to vent each of the volumetric measuring cavities as they come into registry with the outlet or discharge opening in the transfer plate housing so as to assure that the more viscous products will discharge under the action of gravity from the discharge opening upon registry of a given volumetric measuring cavity therewith.

A spring-loaded face sealing effect is provided for the top and bottom sealing plates to preclude any possible binding of the components due to thermal expansion or contraction when the food product is heated or cooled, respectively, before serving.

The transfer plate is driven by means of a selectively engageable programmed clutching mechanism driven by the drive motor such that by engaging the clutch and programming the number of rotations of a drive pinion engaging an integral ring gear on the circumference of the transfer plate a predetermined number of volumetric cavities are necessarily registered with the outlet opening in the housing. This permits a direct but off-center drive such that the drive pinion, the impeller means and the programmed clutch are all on a common motor shaft.

BRIEF DESCRIPTION OF THE DRAWINGS

FIG. 4, is a partial cross-sectional detail taken along line 4—4 of FIG. 2 illustrating the drive mechanism of the soup dispenser of the present invention;

FIG. 5, is a top plan view of a bottom sealing plate of the present invention;

FIG. 6, is a cross-section taken along line 6—6 of FIG. 5;

DETAILED DESCRIPTION OF THE DRAWINGS

Figure 3:
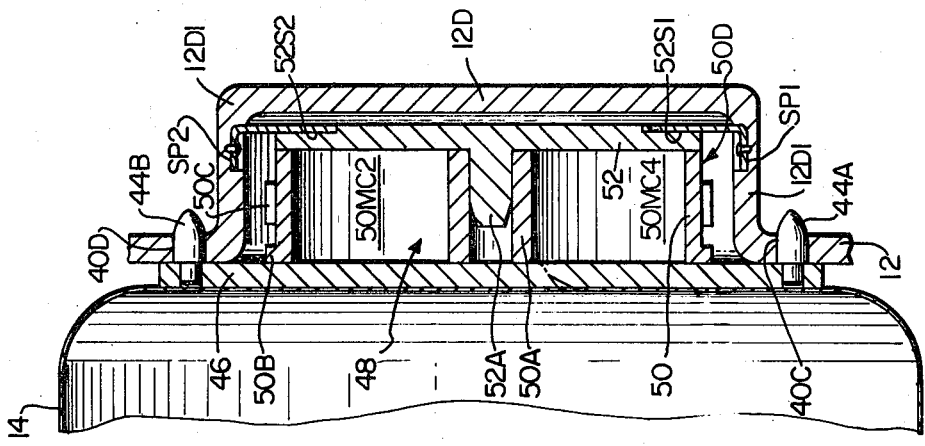
FIG. 3, is a detail of the dispensing assembly and spring-biased sealing means therefor of the present invention in partial cross-section taken along line 3—3 of FIG. 1.

Referring in detail to FIGS. 1, 2, 3 and 4 of the drawings, the soup dispenser 10 of the present invention is shown as including a main housing assembly 12 telescopically receiving a reservoir container 14 which is preferably made of stainless steel or the like and which housing 12 further includes dual heating bands 16 suitably mounted in the walls of the housing 12 by connections 18 or the like and an upper insulating ring 20 which maintains the dual heating bands 16 on an internal annular shoulder 22 formed in the interior wall portion of the housing 12.

The main housing 12 includes a dependent supporting structure 12A, having a plurality of rubber feet 12B or the like beneath the bottom plate 12C thereof to provide a housing and mounting structure for a drive motor 24. The drive motor 24 includes a cooling fan assembly 26 extending from the lowermost end thereof and has an extended output shaft 30 extending from the uppermost end thereof which is the input of a single revolution clutch device 32, which in turn has an output pinion gear 34 at the uppermost end thereof and an impeller shaft 36 coaxial with the output pinion gear 34 and rotatable internally thereof and internally of the clutch 32 as an extension of the output shaft 30 of the motor 24. The impeller shaft 36 mounts an impeller 38 on the uppermost end thereof within the reservoir 14 into which it extends through a bearing bracket assembly 40 and a shaft seal 42 extending through the floor 14A of the reservoir 14. The bearing bracket assembly 40 is bolted at 40A to a portion of the main housing structure 12 as illustrated in FIG. 2 and FIG. 1.

Figure 1:
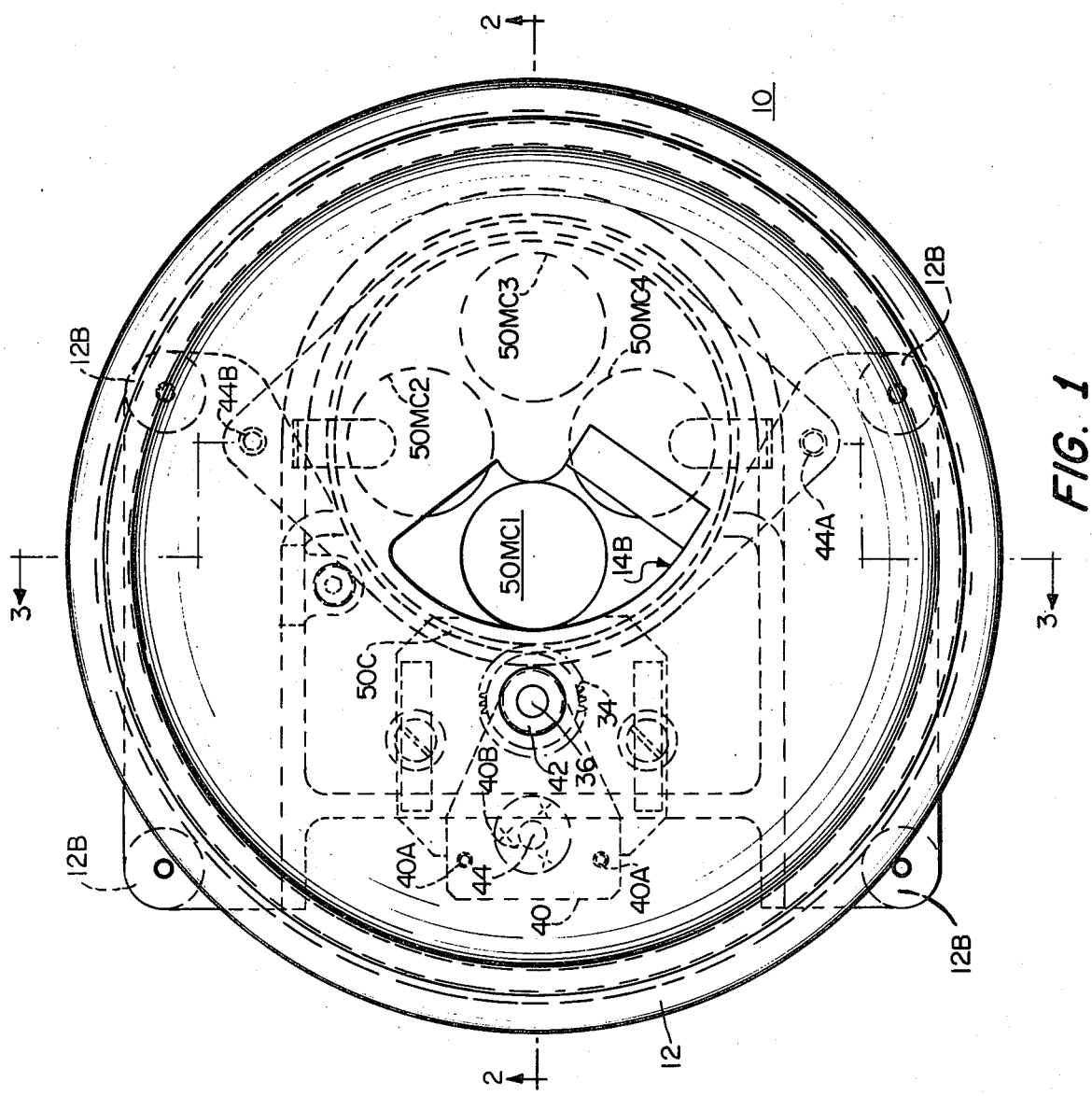
FIG. 1, is a top plan view of soup dispenser looking down into the reservoir containing the soup or the like with the lid removed.
Figure 2:
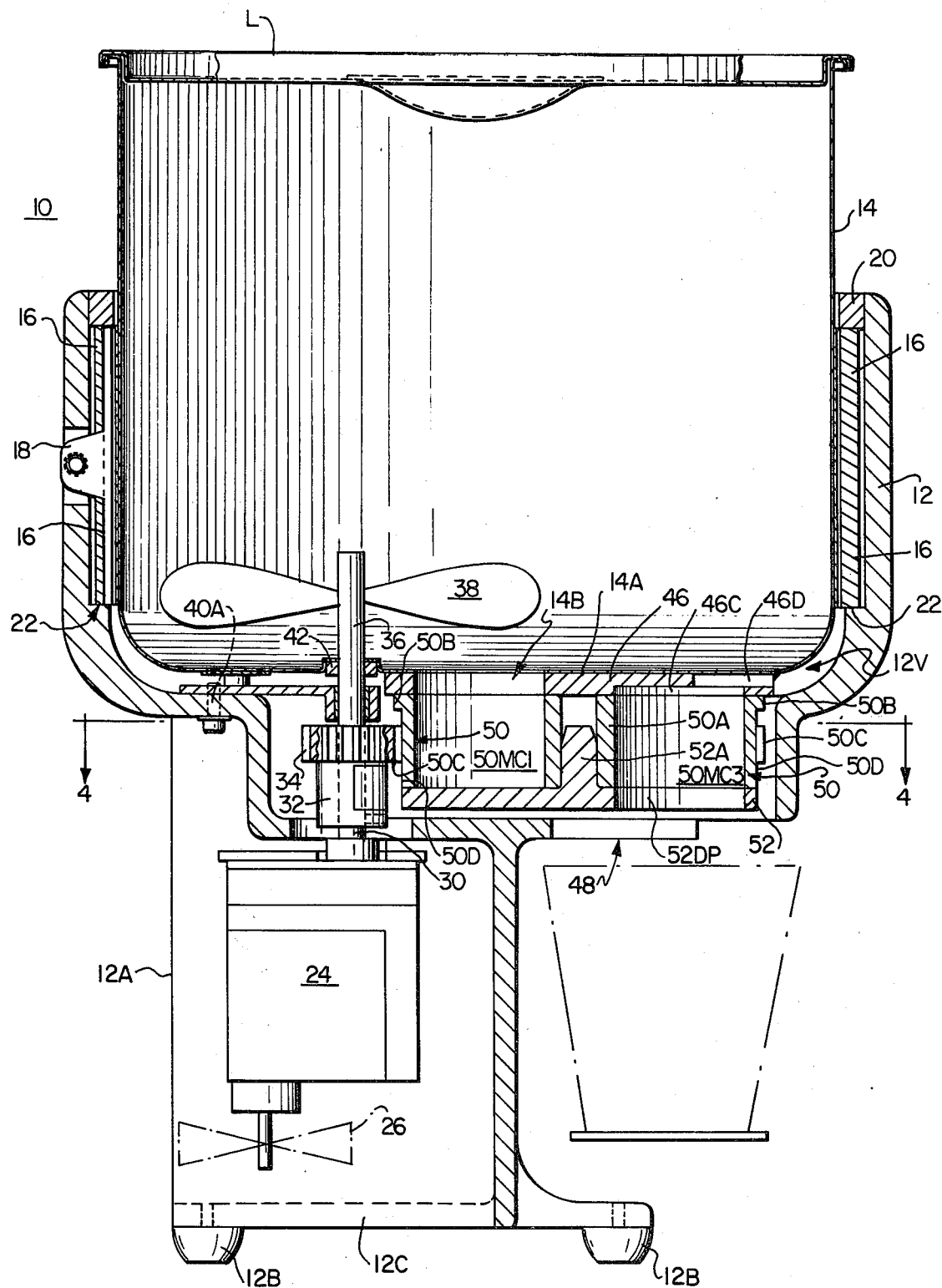
FIG. 2, is a partial cross-section taken along line 2—2 of FIG. 1.

Extending downward through the bracket 40 and into a socket 40B as illustrated in FIGS. 1 and 2, is a first reservoir locator pin 44 which extends downward through the bracket 40 into the socket 40B, the latter being extended into a portion of the underside of the main housing 12.

As shown in FIG. 3, second and third additional locator pins 44A and 44B extend downward from a position in the upper sealing plate 46 of the dispensing assembly 48, the latter to be hereinafter more fully described, downward into the underside or underneath web portion of the main housing 12 in locator sockets 40C and 40D, respectively, to thereby provide in conjunction with the socket 40B a triangular set of locators by which the reservoir 14 is properly positioned within the housing 12.

In the dispensing assembly 48, the upper sealing plate 46 is welded to the bottom side of the bottom web 14A of the reservoir 14 and includes outboard ear portions which mount the locator studs 44A and 44B in the said upper sealing plate 46.

Defined in the bottom 14A of the reservoir 14 is an arcuately-shaped masking port 14B which is in registry with a similarly arcuately-shaped inlet port 46B in the top sealing plate 46 of the dispensing assembly 48. The intake port 46B in the top sealing plate 46 includes a knife-blade or knife-edge 46A formed along one side thereof such that the knife-edge extends inboard of the masking port 14B in the reservoir 14 as best illustrated in FIG. 1.

Figure 7:
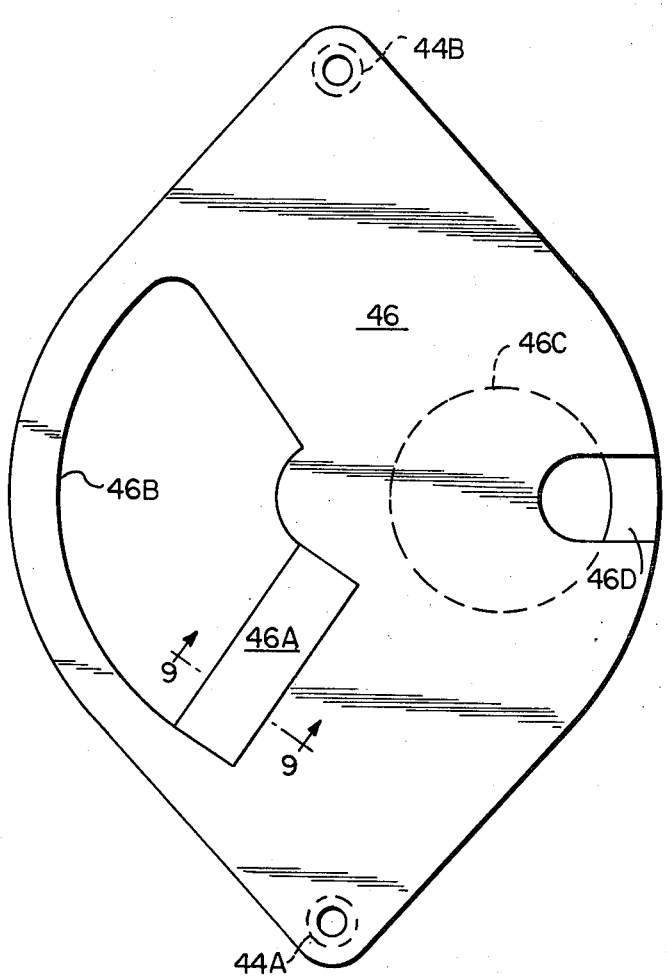
FIG. 7, is a top plan view of the upper sealing plate and knife-edge and intake opening with the reservoir detached and illustrating the interconnection of a venting port in the sealing plate which cooperates with the dispensing opening in the bottom sealing plate of FIG. 5.
Figure 8:
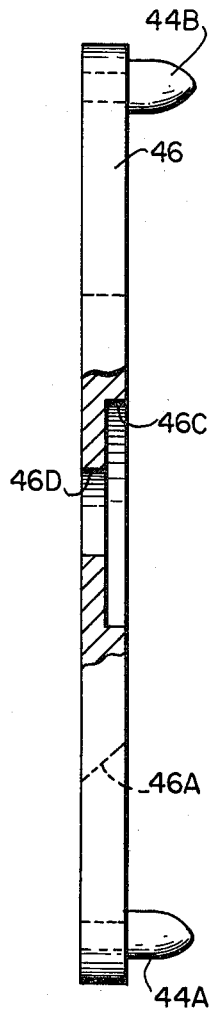
FIG. 8, is a side elevation of the top sealing plate of FIG. 7 in partial cross-section across the vent therein.
Figure 9:
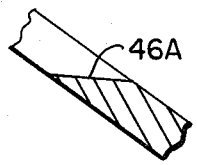
FIG. 9, is an enlarged cross-sectional detail of the knife means of the present invention taken along line 9—9 of FIG. 7.

Referring additionally to FIGS. 7, 8 and 9, the top sealing plate 46 is shown in full detail with the knife-edge 46A being illustrated in cross-section in FIG. 9 and in top plan view in FIG. 7.

The top sealing plate 46 includes a cylindrical cavity 46C on the lowermost side thereof which comprises a venting cover for successively registered venting chambers in a venting dial assembly to be hereinafter more fully described.

Also, as illustrated in FIGS. 7, 8 and 2, the cover chamber 46C is in communication with the inboard end of a vent slot 46D which has been milled or molded into the upper surface of the upper sealing plate 46 such that a radially extending vent port is provided adjacent and beneath the bottom web 14A of the reservoir 14 which communicates the vent cover chamber 46C with the interior of the main housing 12, the latter not being airtight and therefore, venting the venting cover chamber 46C to atmosphere through the radial slot 46D and the interior of the main housing 12 as best illustrated at 12V in FIG. 2.

In sliding, surface sealed juxtaposition with the lower surface of the upper sealing plate 46 is a dispensing cylindrical dial assembly 50 which is preferably coated in its entirety and any event over its upper and lower flat surfaces with a Food and Drug Administration approved, friction reducing high release material which will effectuate a sliding and rotating surface-to-surface seal between the upper and lower surfaces of the cylindrical dial plate, the lower surface of the upper sealing plate 46 and the upper surface of a lower sealing and supporting plate 52 which is illustrated in FIGS. 2, 3, 5 and 6.

Referring to FIGS. 2, 3, 5 and 6, the dispensing dial assembly 50 is shown as including a hollow hub portion 50A having a bore therein which fits over an upstanding indexing stub 52A on the lower sealing and supporting plate 52 to assure the proper alignment of the said dispensing dial 50 and the lower sealing plate 52 and with the said hollow hub 50A being surrounded by a plurality of radially disposed measuring cavities 50MC1 . . . 50MC4, which comprise cylindrical cavities of, for example, a capacity of two fluid ounces each, for the purpose of measuring successive two-ounce portions of soup or the like contained in the reservoir 14 and delivering them to a discharge port 52DP formed in and through the lower sealing plate 52 in registry with the vent cap 46C in the upper sealing plate 46 in the dispensing assembly 48.

The dispensing assembly 48 is maintained in assembled relationship by means of angular leaf springs SP1 and SP2, best illustrated in FIG. 3, which maintain the dispensing assembly within a lower subhousing 12D by extending from the vertical wall portions 12D1 of the latter, into conformally shaped spring receiving slots 52S1 and 52S2 in the lower sealing and supporting plate 52 to thereby force the lower sealing plate 52 upward against the cylindrical dial assembly 50 and in turn force the latter into sliding surface sealed engagement with the upper sealing plate 46. The cross-section of the dispensing assembly 48 most illustrative of the surface contact between the various components of the said dispensing assembly 48 is best illustrated in FIGS. 2 and 3.

The dispensing cylindrical dial assembly 50 is provided with upper outer peripheral annular flange 50B which is vertically spaced from a ring gear 50C integrally formed about the periphery of the dial 50 and coaxially rotatable therewith. Beneath the said ring gear 50C is a peripherally disposed cam follower track 50D.

Now, with joint reference to FIGS. 2, 3 and 4, the means for driving the dispensing dial 50 of the dispensing assembly 48 will now be described.

The ring gear 50C peripherally disposed on the dispensing dial assembly 50 is in engagement with the drive pinion 34 on the output hub of the single revolution clutch assembly 32 as clearly illustrated in FIGS. 1, 2 and 4.

The single revolution clutch 32 is of a well-known type in the art and, for example, it is manufactured by the Marquette Metal Products Company, a wholly owned subsidiary of Curtis-Wright Corporation of Cleveland, Ohio under the trade designation Series D indexing clutches, of the shaft in - hub out type.

A clutch actuating rocker arm assembly 54 is provided which includes an internal centrally located pivot means 54A affixed to one of the vertical walls 12D1 of the subhousing 12D and extending therethrough is an external actuating arm portion 54B which when actuated by an operator causes the assembly 54 to pivot about the internal pivot means 54A and cause an internal clutching and cam follower arm 54C to permit the clutch 32 to engage with the impeller shaft 36 and thereby rotate the pinion gear 34 to drive the dial 50 via the ring gear 50C.

Now, within the cam follower track 50D is an elongated dwell 50E which is so indexed and so referenced with respect to the periphery of the dispensing dial or transfer plate structure 50 as to return to its initial position after an excess of three and one half revolutions of the drive pinion 34 (and hence, of the impeller shaft 36 and motor output shaft 30) has occurred and all four of the measuring chambers 50MC1 . . . 50MC4 have been rotated and translated past the dispensing port 52DP in the lower sealing plate 52. At this point in time, a biasing spring assembly 54D mounted in a suitable external socket 12D2 in the outer wall 12D1 of the subhousing 12D acts in compression to thrust the arm 54B outward about the pivot 54A and thereby cause a reflected pivotal motion of the internal clutch actuating arm 54C toward the periphery of the dial 50 and force a projected cam follower 54F on the said actuating arm 54C into engagement with the cam track 50D about the periphery of the dial 50 until such time as the returned elongated dwell 50E receives the cam follower 54F and provides an additional incremental inward swing thereof together with a like inward swing of the clutch actuating arm 54C to thereby set the single revolution clutch to finish the current revolution and then disengage. As a result, after four revolutions of the drive pinion 34 (and hence, of the impeller shaft 36 and motor output shaft 30), the clutch 32 is automatically disengaged by virtue of the gear ratio achieved between the drive pinion 34 and the ring gear 50C to automatically program a given count of measuring chambers in a successive progression past the dispensing port 52DP.

Accordingly, the same amount of soup or other ingredient contained within the reservoir 14 will be dispensed in a like plurality of increments through the dispensing port 52DP each time the external actuating lever 54B is released by an operator.

Because of the arcuate masking port formed in the lower portion or web 14A of the reservoir 14 overlying only a single measuring chamber 50MC1 . . . 50MC4 at any given time, and in no event no more than a portion of two of such measuring chambers, the presence of the impeller immediately above the said masking port 14B and the presence of the knife-blade 46A which scrapes over the upper surface of the dispensing dial or transfer plate structure 50 and provides a food shearing and trimming action in conjunction with the approaching cylindrical or circular upper edge portion of the said measuring chambers as they pass beneath the said knife-blade 46A, the food in the reservoir is maintained homogenized due to the constant stirring action of the impeller on the soup in the reservoir and larger food particles are sheared off to preclude jamming and cavitation by the knife-blade 46A.

The spring-loaded upwardly biased seals between the lower sealing plate 52, the dispensing dial or transfer plate structure 50 and the upper sealing plate 46 provide an assembly which is readily disassembled for purposes of sterilization and which provide an extremely simplistic assembly with a minimum number of parts for the dispensing of soups and other liquid products with or without a high degree of garnish or solids therein.

The dual heating rings 16 are controlled in a manner well-known to those of ordinary skill in the art to operate in unison for rapid heating of food product placed in a reservoir and then to be selectively deactivated to provide a warming action to maintain the temperature of the food in the reservoir.

Thus, the unit is a self-contained soup heating and serving system in which relatively smaller quantities of soup can be processed for large crowds or large numbers of servings by having a rapid heating and subsequent warming capability to thereby permit addition of soup to the content of the reservoir as it approaches an empty state and thereby materially reduce waste and breakdown in the physical character of the soup or liquid food product contained in the reservoir.

It should be understood that the SOUP DISPENSER of the present invention may be modified as would occur to one of ordinary skill in the art without departing from the spirit and scope of the present invention.

It is claimed:

1. A dispensing assembly for dispensing volumes of liquid or semi-liquid food product from the bottom of a reservoir by gravity filling and emptying, comprising:
   a rotary dial shaped transfer plate means having a circular pattern of substantially identically configured measuring chambers formed therein and extending therethrough parallel to a central axis of rotation;
   a conformal housing for said transfer plate means open at its top and having a supporting plate across the bottom thereof coextensive with said transfer plate means, said supporting plate having a discharge opening formed therein of substantially identical configuration as said measuring chambers for successive registry therewith in response to rotations of said transfer plate means on said central axis of rotation within said housing;
   sealing plate means fixed from rotation on said housing over said transfer plate means and overlying an area on said transfer plate means coincident with the said discharge opening and surface areas adjacent thereto and greater than the cross-sectional area of a said measuring chamber and having an intake port formed therein in registry with successive ones of said measuring chambers during rotation of said transfer plate;
   said sealing plate means including vent port means in registry with said discharge opening through successive ones of said measuring chambers;
   motor means having a rotary output shaft mounted for rotation adjacent said transfer plate means in said housing; and
   drive means selectively actuated to interconnect said output shaft with said transfer plate means for rotating the latter in an amount to register a predetermined number of measuring chambers with said discharge opening for each selective actuation of said drive means.

2. The dispensing assembly defined in claim 1, wherein said transfer plate means includes top and bottom surfaces and the top and bottom surfaces of said transfer plate means are covered with a friction reducing sealing material; and
   wherein said dispensing assembly further includes spring means applying sealing pressure at said covered surfaces to allow for thermal expansion and contraction in said dispensing assembly.

3. The dispensing assembly defined in claim 2, wherein said supporting plate comprises:
   a circular plate coaxially and coterminately juxtaposed with said transfer plate means; and
   a pair of diametrically opposed recesses defined in the lowermost side of said circular plate adjacent the periphery thereof; and
   wherein said spring means comprises first and second leaf spring angles each fixed at one end to said housing and conformally received at the other end in a respective one of said opposed recesses beneath said circular plate.

4. The dispensing assembly defined in claim 1, wherein said drive means comprises:
   a single revolution clutch means mounted on said output shaft;
   an actuating means for said clutch means mounted in said conformal housing and including an actuating lever external to said housing;
   a peripheral cam surface on said rotary transfer plate means presenting a dwell portion therein at less than one full revolution of said transfer plate means;
   said actuating means including follower means engaging said cam surface and control means for disengaging said clutch in response to the engagement of said follower means with said dwell portion of said cam surface.

5. The invention defined in claim 4, wherein one full revolution of said transfer plate means occurs for a predetermined plurality of revolutions of said output shaft, a partial revolution of the latter in the last of said plurality of revolutions occurring prior to the engagement of said follower means with said dwell portion of said cam surface; and
   wherein said clutch means is disengaged at the completion of said last revolution of said output shaft.

6. The invention defined in claim 5, wherein said transfer plate means includes top and bottom surfaces and the top and bottom surfaces of said transfer plate means are covered with a friction reducing sealing material; and
   wherein said dispensing assembly further includes spring means applying sealing pressure at said covered surfaces to allow for thermal expansion and contraction in said dispensing assembly.

7. The invention defined in claim 6, wherein said supporting plate comprises:
   a circular plate coaxially and coterminately juxtaposed with said transfer plate means; and
   a pair of diametrically opposed recesses defined in the lowermost side of said circular plate adjacent the periphery thereof; and
   wherein said spring means comprises first and second leaf spring angles each fixed at one end to said housing and conformally received at the other end in a respective one of said opposed recesses beneath said circular plate.

8. The invention defined in claim 4, wherein said transfer plate means includes top and bottom surfaces and the top and bottom surfaces of said transfer plate means are covered with a friction reducing sealing material; and
   wherein said dispensing assembly further includes spring means applying sealing pressure at said covered surfaces to allow for thermal expansion and contraction in said dispensing assembly.

9. The invention defined in claim 8, wherein said supporting plate comprises:
   a circular plate coaxially and coterminately juxtaposed with said transfer plate means; and
   a pair of diametrically opposed recesses defined in the lowermost side of said circular plate adjacent the periphery thereof; and
   wherein said spring means comprises first and second leaf spring angles each fixed at one end to said housing and conformally received at the other end in a respective one of said opposed recesses beneath said circular plate.

10. The dispensing assembly of claim 1, wherein said sealing plate means is integrally affixed to the bottom of a said reservoir and said intake port defined therein extends through said bottom;
    wherein said output shaft of said motor extends through said bottom into said reservoir adjacent said intake port; and
    wherein said dispensing assembly further includes impeller means in said reservoir rotatable with said output shaft and extending over said intake opening.

11. The dispensing assembly of claim 10, wherein said transfer plate means includes top and bottom surfaces and the top and bottom surfaces of said transfer plate means are covered with a friction reducing sealing material; and wherein said dispensing assembly further includes spring means applying sealing pressure at said covered surfaces to allow for thermal expansion and contraction in said dispensing assembly.

12. The dispensing assembly of claim 11, wherein said supporting plate comprises:

a circular plate coaxially and coterminately juxtaposed with said transfer plate means; and a pair of diametrically opposed recesses defined in the lowermost side of said circular plate adjacent the periphery thereof; and wherein said spring means comprises first and second leaf spring angles each fixed at one end to said housing and conformally received at the other end in a respective one of said opposed recesses beneath said circular plate.

13. The dispensing assembly defined in claim 10, wherein said drive means comprises:

a single revolution clutch means mounted on said output shaft;

an actuating means for said clutch means mounted in said conformal housing and including an actuating lever external to said housing;

a peripheral cam surface on said rotary transfer plate means presenting a dwell portion therein at less than one full revolution of said transfer plate means;

said actuating means including follower means engaging said cam surface and control means for disengaging said clutch in response to the engagement of said follower means with said dwell portion of said cam surface.

14. The invention defined in claim 13, wherein one full revolution of said transfer plate means occurs for a predetermined plurality of revolutions of said output shaft, a partial revolution of the latter in the last of said plurality of revolutions occurring prior to the engagement of said follower means with said dwell portion of said cam surface; and wherein said clutch means is disengaged at the completion of said last revolution of said output shaft.

15. The invention defined in claim 14, wherein said transfer plate means includes top and bottom surfaces and the top and bottom surfaces of said transfer plate means are covered with a friction reducing sealing material; and wherein said dispensing assembly further includes spring means applying sealing pressure at said covered surfaces to allow for thermal expansion and contraction in said dispensing assembly.

16. The invention defined in claim 15, wherein said supporting plate comprises:

a circular plate coaxially and coterminately juxtaposed with said transfer plate means; and a pair of diametrically opposed recesses defined in the lowermost side of said circular plate adjacent the periphery thereof; and wherein said spring means comprises first and second leaf spring angles each fixed at one end to said housing and conformally received at the other end in a respective one of said opposed recesses beneath said circular plate.

17. The invention defined in claim 13, wherein said transfer plate means includes top and bottom surfaces and the top and bottom surfaces of said transfer plate means are covered with a friction reducing sealing material; and wherein said dispensing assembly further includes spring means applying sealing pressure at said covered surfaces to allow for thermal expansion and contraction in said dispensing assembly.

18. The invention defined in claim 17, wherein said supporting plate comprises:

a circular plate coaxially and coterminately juxtaposed with said transfer plate means; and a pair of diametrically opposed recesses defined in the lowermost side of said circular plate adjacent the periphery thereof; and wherein said spring means comprises first and second leaf spring angles each fixed at one end to said housing and conformally received at the other end in a respective one of said opposed recesses beneath said circular plate.

19. The dispensing assembly of claim 10, wherein said reservoir is removably positioned within the open top of said conformal housing; and wherein said housing and said reservoir include alignment means respectively interengageable to uniformly reposition said reservoir in said housing and maintain said sealing plate means and impeller means in proper alignment with said transfer plate means.

20. The dispensing assembly defined in claim 19, wherein said transfer plate means includes top and bottom surfaces and the top and bottom surfaces of said transfer plate means are covered with a friction reducing sealing material; and wherein said dispensing assembly further includes spring means applying sealing pressure at said covered surfaces to allow for thermal expansion and contraction in said dispensing assembly.

21. The dispensing assembly defined in claim 20, wherein said supporting plate comprises:

a circular plate coaxially and coterminately juxtaposed with said transfer plate means; and a pair of diametrically opposed recesses defined in the lowermost side of said circular plate adjacent the periphery thereof; and wherein said spring means comprises first and second leaf spring angles each fixed at one end to said housing and conformally received at the other end in a respective one of said opposed recesses beneath said circular plate.

22. The dispensing assembly defined in claim 19, wherein said drive means comprises:

a single revolution clutch means mounted on said output shaft;

an actuating means for said clutch means mounted in said conformal housing and including an actuating lever external to said housing;

a peripheral cam surface on said rotary transfer plate means presenting a dwell portion therein at less than one full revolution of said transfer plate means;

said actuating means including follower means engaging said cam surface and control means for disengaging said clutch in response to the engagement of said follower means with said dwell portion of said cam surface.

23. The invention defined in claim 22, wherein one full revolution of said transfer plate means occurs for a predetermined plurality of revolutions of said output shaft, a partial revolution of the latter in the last of said plurality of revolutions occurring prior to the engagement of said follower means with said dwell portion of said cam surface; and
   wherein said clutch means is disengaged at the completion of said last revolution of said output shaft.

24. The invention defined in claim 23, wherein said transfer plate means includes top and bottom surfaces and the top and bottom surfaces of said transfer plate means are covered with a friction reducing sealing material; and
   wherein said dispensing assembly further includes spring means applying sealing pressure at said covered surfaces to allow for thermal expansion and contraction in said dispensing assembly.

25. The invention defined in claim 24, wherein said supporting plate comprises:
   a circular plate coaxially and coterminately juxtaposed with said transfer plate means; and
   a pair of diametrically opposed recesses defined in the lowermost side of said circular plate adjacent the periphery thereof; and
   wherein said spring means comprises first and second leaf spring angles each fixed at one end to said housing and conformally received at the other end in a respective one of said opposed recesses beneath said circular plate.

26. The invention defined in claim 22, wherein said transfer plate means includes top and bottom surfaces and the top and bottom surfaces of said transfer plate means are covered with a friction reducing sealing material; and
   wherein said dispensing assembly further includes spring means applying sealing pressure at said covered surfaces to allow for thermal expansion and contraction in said dispensing assembly.

27. The invention defined in claim 26, wherein said supporting plate comprises:
   a circular plate coaxially and coterminately juxtaposed with said transfer plate means; and
   a pair of diametrically opposed recesses defined in the lowermost side of said circular plate adjacent the periphery thereof; and
   wherein said spring means comprises first and second leaf spring angles each fixed at one end to said housing and conformally received at the other end in a respective one of said opposed recesses beneath said circular plate.

28. The dispensing assembly of claim 1, wherein said sealing plate means includes cutting means in said intake port cooperating with said transfer plate means to preclude excess food product from remaining in a said measuring chamber in said transfer plate means.

29. The dispensing assembly of claim 28, wherein said sealing plate means further includes a shallow chamber defined in the lowermost side thereof adjacent said transfer plate means, said chamber being of like configuration and in alignment with said discharge opening in said supporting plate and positioned for successive registry with said measuring chambers; and
   a radial trough defined between said shallow chamber and the periphery of said sealing plate means comprising a vent for assisting the discharge of food product from said measuring chambers.

30. The dispensing assembly of claim 1, wherein said sealing plate further includes a shallow chamber defined in the lowermost side thereof adjacent said transfer plate means, said chamber being of like configuration and in alignment with said discharge opening in said supporting plate and positioned for successive registry with said measuring chambers; and
   a radial trough defined between said shallow chamber and the periphery of said sealing plate comprising a vent for assisting the discharge of food product from said measuring chambers.

* * * * *